(12) United States Patent
Tichý et al.

(10) Patent No.: US 10,232,567 B2
(45) Date of Patent: Mar. 19, 2019

(54) DEVICE FOR LAYING UP A COMPOSITE PRODUCT WITH FIBROUS ROVINGS

(71) Applicants: MAGNA EXTERIORS (Bohemia) S.R.O., Liberec VI-Rochlice (CZ); AURA-ENGINEERING HRANICE S.R.O., Hranice (CZ)

(72) Inventors: Stanislav Tichý, Liberec (CZ); Jiří Klauz, Bakov nad Jizerou (CZ); Paul Hasl, Liberec (CZ); Jaromir Straka, Hranice (CZ)

(*) Notice: Subject to any disclaimer, the term of this patent is extended or adjusted under 35 U.S.C. 154(b) by 0 days.

(21) Appl. No.: 15/565,824

(22) PCT Filed: Apr. 19, 2016

(86) PCT No.: PCT/CZ2016/000046
§ 371 (c)(1),
(2) Date: Oct. 11, 2017

(87) PCT Pub. No.: WO2016/169531
PCT Pub. Date: Oct. 27, 2016

(65) Prior Publication Data
US 2018/0111340 A1    Apr. 26, 2018

(30) Foreign Application Priority Data
Apr. 24, 2015  (CZ) .................................... 2015-275

(51) Int. Cl.
*B29C 70/38*  (2006.01)
*B29C 53/58*  (2006.01)
(Continued)

(52) U.S. Cl.
CPC ............ *B29C 70/38* (2013.01); *B29C 53/588* (2013.01); *B29C 53/68* (2013.01); *B29K 2105/10* (2013.01); *B29L 2031/3055* (2013.01)

(58) Field of Classification Search
CPC .................................................... B29C 70/38
(Continued)

(56) References Cited

U.S. PATENT DOCUMENTS 4,768,725 A * 9/1988 Daines .................. B65H 81/04
242/434.5
8,491,828 B2   7/2013 Wetzels et al.
(Continued)

FOREIGN PATENT DOCUMENTS

| CZ | 20080607 | 4/2010 |
| DE | 3843488 | 7/1990 |

(Continued)

*Primary Examiner* — Jeffry H Aftergut
(74) *Attorney, Agent, or Firm* — Dykema Gossett PLLC (57) ABSTRACT

Device for laying up a composite product with fibrous rovings made from glass, carbon, aramid and other similar filaments, designed especially for production of composite reinforcements or supporting elements such as the reinforcement of tailgates of personal vehicles, consists of individual unwinding spools (2) of fibrous rovings (21) rotatably arranged around the composite product (1). The unwinding spools (2) are installed on the set of the rotary disc rings (3) which are mounted on a common fixed ring frame (4) and equipped with independent drives (5) with pre-programmed control of direction and speed of their rotation wherein the composite product (1) is during the laying up procedure alternately fixed to individual carrier grippers (8) of at least one program-controlled manipulator (9). In each rotary disc ring (3) as well as in fixed ring frame (4) at least one lateral passage (6) is created for entry and exit of the composite product (1) between the unwinding spools (2).

7 Claims, 7 Drawing Sheets

(51) Int. Cl.
*B29C 53/68* (2006.01)
*B29K 105/10* (2006.01)
*B29L 31/30* (2006.01)

(58) Field of Classification Search
USPC .................................... 156/425, 169, 245
See application file for complete search history.

(56) References Cited

U.S. PATENT DOCUMENTS

| 2003/0051795 A1* | 3/2003 | Burgess ................. B29C 53/68 |
| | | 156/169 |
| 2006/0175454 A1* | 8/2006 | Allen .................... B29C 53/588 |
| | | 242/439.5 |
| 2007/0125487 A1* | 6/2007 | Elliott ................. B29C 53/8016 |
| | | 156/161 |

FOREIGN PATENT DOCUMENTS

| NL | 2003620 | 4/2011 |
| WO | WO-2011/082709 A1 * | 7/2011 |
| WO | WO-2011/096805 A1 * | 8/2011 |

* cited by examiner

DEVICE FOR LAYING UP A COMPOSITE PRODUCT WITH FIBROUS ROVINGS

FIELD OF THE INVENTION

The invention relates to a device for laying up a composite product with fibrous rovings made from glass, carbon, aramid or other similar filaments designed especially for production of composite reinforcements or supporting elements, parts of motor vehicle bodies, e.g. for reinforcement of the tailgates of personal vehicles for reducing or even elimination of the effects of stress acting on them during their use.

BACKGROUND OF THE INVENTION

Composite materials are currently widely used materials consisting of fibrous reinforcement and of a plastic binder, so called matrix, and whose basic advantage is a substantially lower weight in comparison with metallic materials such as steel. Reinforcing fibres made for instance from carbon, glass or a polymer may be included in the composite as chopped with lengths of few millimeters, which are dispersed in a matrix, or continuous in form of strands, so called rovings. Composites with continual reinforcing fibres are mostly produced by laminating fibers impregnated with a suitable matrix on a suitable mould core with a shape that corresponds to the shape of the desired composite article, for example via sequential laying up of the mould core with individual ravings.

From patent in this field, for example a fiber composite product comprising of at least one structural unit of continuous reinforcing fibers impregnated with a polymeric binder according the Czech patent application CZ 20080607. This structural unit consists of a main fibre bundle which is parallel to the longitudinal axis of the bundle and of the laying up or winding bundle of fibres helically arranged around the periphery of the main fibre bundle.

Furthermore the patent document US 2006/0175454 indicates an apparatus and method for laying up structural filaments. The apparatus includes an openable race providing a circular path for a carrier bearing a filament source. The carrier moves circumferentially with the race and may be formed as a centerless wheel. The carrier may be formed in sections to facilitate opening of the race to insert a workpiece. Similar method and apparatus are known also from the document NL 2003620 or from the document WO 2011096805.

However these known solutions mostly concern devices for production of composite articles of simple shapes, i.e. mostly in the form of straight or only slightly curved rods or tubes, which are consequently closed to create frame structures such as' bicycle frames and the like with couplings. The complex loads acting on these composite products are not fully considered if they shall be used as reinforcements of more complicated components, such as the tailgate of personal vehicles, etc. Therefore it is necessary, especially for mass produced vehicles, to use metal reinforcements or metal frames in these cases because a device that would allow the production of 3D shaped closed composite product that can be complexly loaded is not yet available.

SUMMARY OF THE INVENTION

These disadvantages of the current state of technology are largely eliminated by the device for laying up a composite product with fibrous rovings made from glass, carbon, aramid and other similar filaments designed especially for production of composite reinforcements or supporting elements such as the reinforcement of the tailgate of personal vehicles, which consists of individual unwinding spools with fibrous rovings, rotatably arranged around the composite product according to the present invention. The unwinding spools are installed on the set of rotary circular disc rings which are mounted to a common fixed ring frame and are provided with independent drives with pre-programmed controlling of the direction and speed of their rotation. The composite product is alternatively retained by individual carrier grippers of at least one program-controlled main manipulator during its winding, thus allowing its passage through the inner space of the rotary disc rings and through the fixed ring frame in course of the laying up procedure. On each rotary disc ring as well as in the fixed ring frame at least one lateral passage is created between the unwinding spools for the entry and exit of the composite product.

For alternate grabbing of the composite product before and after entering the composite product into the laying up equipment two or even more such main manipulators may be used instead of one. The alternate grip of the composite product in carrier grippers will then ensure its laying up at all its points, whereas its mounting in at least five different fastening points, in particular at locations where it is subject to the greatest stress during laying up, seems to be quite sufficient.

In order to automate the entire process and speed of laying up the substitution of fibrous rovings is required, the rotary disc rings are mounted to a common fixed ring frame with the benefit of being removable thus enabling their automatic removal after emptying the unwinding spools and their subsequent replacement with rotary disc rings with refilled unwinding spools or unwinding spools with other fibrous rovings.

To enable the start of each new lay up cycle, each rotary disc ring is preferably equipped with a central openable ring for introducing the composite product and the fibrous ravings from the unwinding spools into its inner space. The set of rotary disc rings comprises of e.g. three rotary disc rings which are mounted laterally on the fixed ring frame. This set allows simultaneous winding of three layers of fibrous rovings on the product to be laid up. The first rotary disc ring is equipped with the first independent drive, the second rotary disc ring with the second independent drive and the third rotary disc ring with the third independent drive with the benefit of each drive having programmable controlled speed and the controlled direction of their rotation for winding the fibrous rovings to the composite product with variable pitch to its central axis. The rotary disc rings can all be mounted from just one side of the ring frame or from both its sides, whereas one of them may e.g. at zero speed of rotation wind up or lay longitudinal fibrous rovings to the composite product parallel to its axis, the other one at a certain speed of rotation may wind fibrous rovings to the composite product helically with a certain pitch, and the third at another certain speed and opposite direction of rotation than the rotation of the second rotary disc ring winds fibrous rovings to the composite product also helically but with the opposite angle and degree of pitch.

The greater number of rotary disc rings, increases the number of simultaneously wound layers of fibrous rovings to the composite product, thus improving the productivity of the whole process.

An auxiliary device is arranged on one side of the system of the rotary circular rings laid on the fixed ring frame for automatic beginning and end of lay up, and on the other side is a loading manipulator with an extruding split mandrel for loading fibrous rovings through the central openable rings toward the auxiliary device. The auxiliary device for the automatic beginning and end of the lay up may consist of e.g. an auxiliary manipulator with a banding mechanism for taping the fibrous rovings to the composite product before and after laying up, as well as a split mechanism for its cutting off.

The program-controlled main manipulator can also be provided with a tool changer for exchanging the carrier grippers of the closed composite product for assembly grippers of the rotary disc rings to the hard ring frame in the case the spools run out filament material and are in need of refilling. Otherwise it would be necessary to use another independent program-controlled manipulator for the mounting or disassembly of the disc rings from the fixed ring frame, which would, as in the case of using more main manipulators, substantially increase the purchase cost of the entire device.

The device according to the invention allows, unlike devices known so far, the production of composite reinforcements or the supporting elements of complex and enclosed 3D shapes. At the same time this device allows winding to the composite product variously oriented layers of the fibrous rovings, while in particular the program-controlled main manipulator together with the separate drives of the rotary disc rings with pre-programmed controlling of the direction and speed of their rotation enables control of the internal structure of the individual wound layers, in terms of density and/or winding angle and/or type of fibrous rovings. The advantage is then after impregnation of the wound layers with the polymeric matrix, consisting e.g. of polyurethane, in particular the possibility of achieving the desired mechanical properties in each point of the resulting composite reinforcement, mainly due to the above-mentioned variable-density of lay up, while also a cross-section of the core of the composite product may be freely varied as required by the structure of the final part. This is based on the fact that the internal structure of the composite layer, exposed to torsion should consist mainly of helically wound fibrous rovings and under tensile stress and/or bending especially of the longitudinal fibrous rovings which are fixed due to technological reasons at least by some helical fibrous rovings. The helically and longitudinal fibrous rovings can in any part of the composite layer be switched seamlessly between one another by changing the angle of their lay up. For reasons of strength the helically wound and longitudinal rovings usually consist of carbon fibrous rovings, while fixing fibrous rovings, for the sake of manufacturing cost savings, can be only formed by fibreglass rovings, even with the angle of pitch much higher than with the helically wound carbon fibrous ravings, because fixation fibrous ravings are only designed to ensure the position of the longitudinally wound carbon fibrous rovings on the perimeter of the reinforcement. The programmed pitch angle of helically wound carbon fibrous ravings usually ranges within the angular range of ±10° to 45° and with the fixation fibrous ravings within the angular range of ±45° to 80°. With longitudinally wound fibrous rovings it is essentially the angle of laying up of 0°. The density of the longitudinally wound fibre bundles in the composite reinforcement part that is subject to bending can also concentrate in the area facing the acting bending stress. Thus the device permits in a single work cycle the application of a larger number of variously oriented and structured layers of fibrous rovings to the composite product, while the device operates in a fully automatic cycle.

BRIEF DESCRIPTION OF THE DRAWINGS

The invention is further clarified by drawings of exemplary optimum execution of the device for laying up a composite product according to the invention, where the following is indicated.

DESCRIPTION OF THE PREFERRED EMBODIMENT

Figure 1:
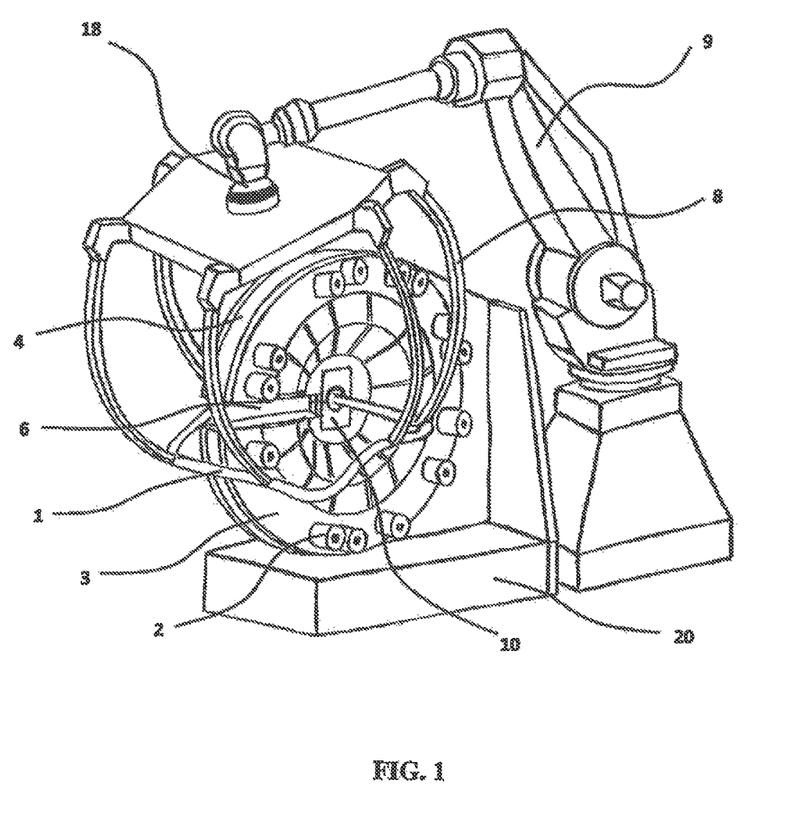
FIG. 1—assembly of the laying up device with composite product and program-controlled main manipulator in 3D view FIG. 2—detail of the rotary disc rings with a fixed ring frame in an expanded condition and 3D view FIG. 3—cross-section schematic layout of rotary disc rings FIG. 4—the set of fixed ring frame with rotary disc rings in 3D view FIG. 5—general view of the device from the direction of the auxiliary device for winding start and end with auxiliary manipulator FIG. 6—view of the device from the direction of the loading manipulator FIG. 7—detail of the mounting gripper for the exchange of the rotary disc rings
Figure 2:
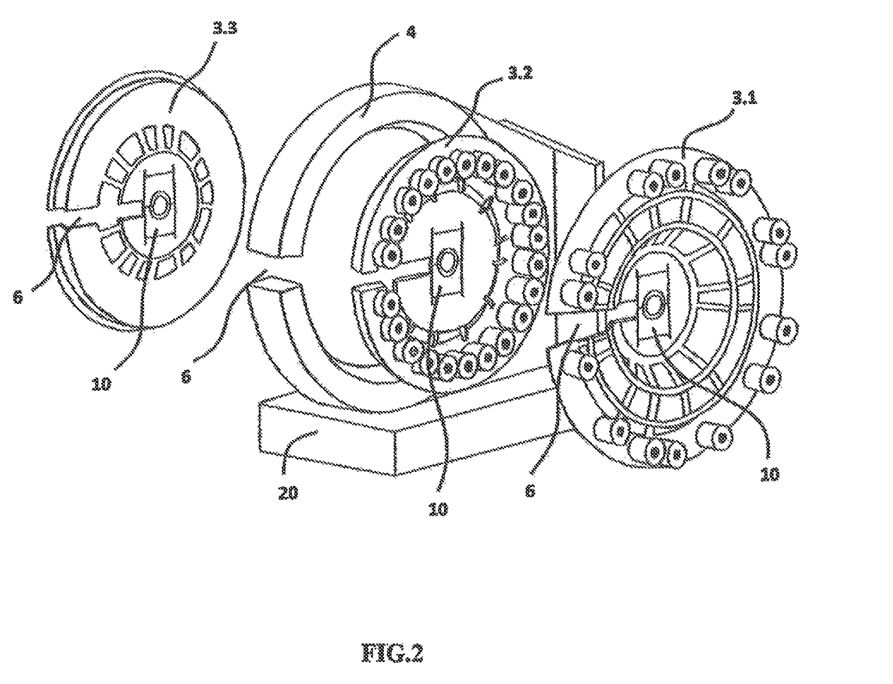
Figure 3:
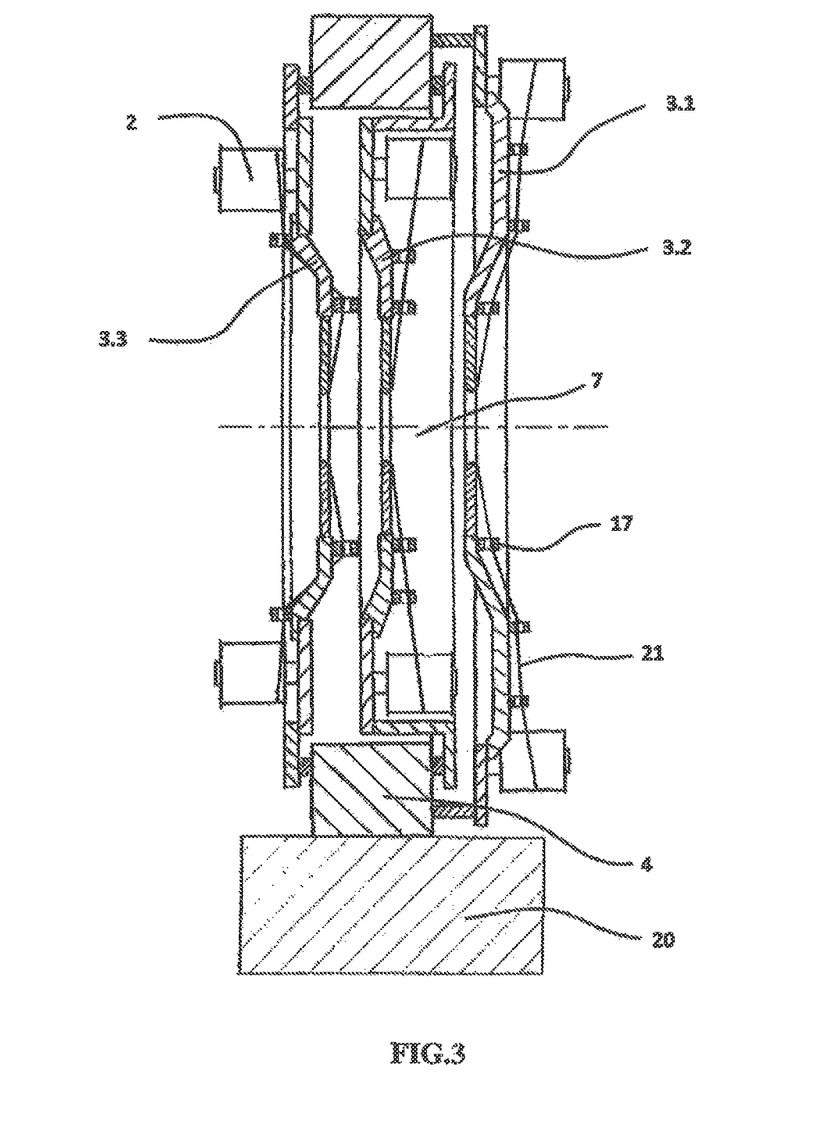

Device for laying up a composite product with fibrous rovings in the preferred embodiment, intended for production of 3D closed frame composite reinforcements for tailgates of personal vehicles, consisting as shown in FIG. 1 to FIG. 3 from the individual unwinding spools 2 arranged rotatably around the composite product t which are fixed to the assembly of three rotary disc rings 3 which are installed coaxially on the fixed ring frame 4. The fixed ring frame 4 is arranged on the base frame 20.

As shown in FIG. 2, the set of rotary disc rings 3 consists of two rotary disc rings 3.1, 3.2 which are arranged on one side of the fixed ring frame 4 and by one rotary disc ring 3.3 deposited on the other side of the fixed ring frame 4. As can be seen particularly from FIG. 2 and FIG. 3, each rotary disc ring 3 is equipped with a central openable ring 10 for introduction of the composite product 1 and of the fibrous rovings 21 from the unwinding spools 2 into its inner space 7 before starting the laying up process. As can then be seen from FIG. 3, on each rotary disc rings 3 are between the individual unwinding spools 2 and the central openable ring 10 positioned some guiding eyelets 17 for the fibrous rovings 21. Since the rotation of the unwinding spools 2 is induced by pulling the fibrous rovings 21 in course of moving the composite product 1 between them, the individual unwinding spools 2 are equipped with—not shown here—variable rotation brakes which are integrated into the pivot bearing and which allow to control the stiffness of the laying up of all fibrous rovings 21 on the composite product 1.

On each rotary disc rings 3, that means on the first rotary disc ring 3.1, on the second rotary disc ring 3.2 as well as on the third rotary disc ring 3.3 are in this embodiment arranged 15 unwinding spools 2. However in other specific embodiments of the invention a different number of unwinding spools 2 may be used as required even on each of the rotary disc rings 3, and on each of the rotary disc rings 3 the unwinding spools 2 with different types of fibrous rovings 21 may be used.

Figure 7:
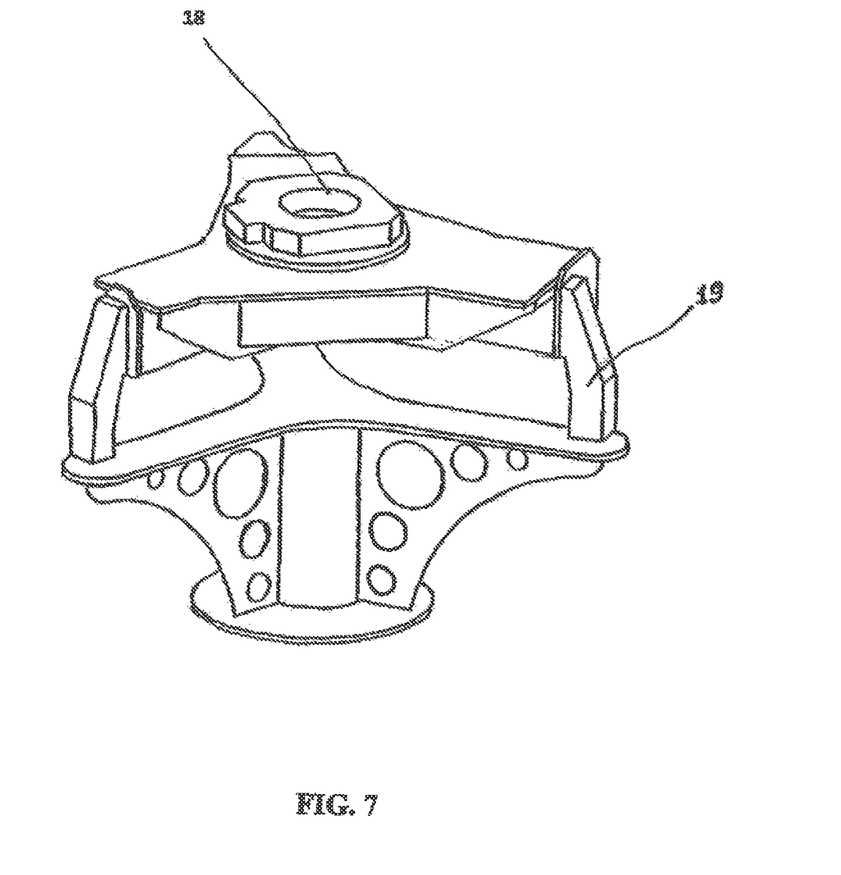

As further seen in FIG. 1, the composite product 1 is during its laying up alternately fixed to carrier grippers 8 of the program-controlled manipulator 9 which is equipped with the tool changer 18 to exchange the carrier grippers 8 for the composite product 1 for assembly grippers 19 of the rotary disc rings 3 on the fixed ring frame 4. These assembly grippers 19 are shown in FIG. 7 as stored on some unmarked base prior to their use. As shown in FIG. 1 to FIG. 3, in each rotary disc ring 3 as well as in fixed ring frame 4 one lateral passage 6 is created for entry and exit of the composite product 1 between the unwinding spools 2.

Figure 4:
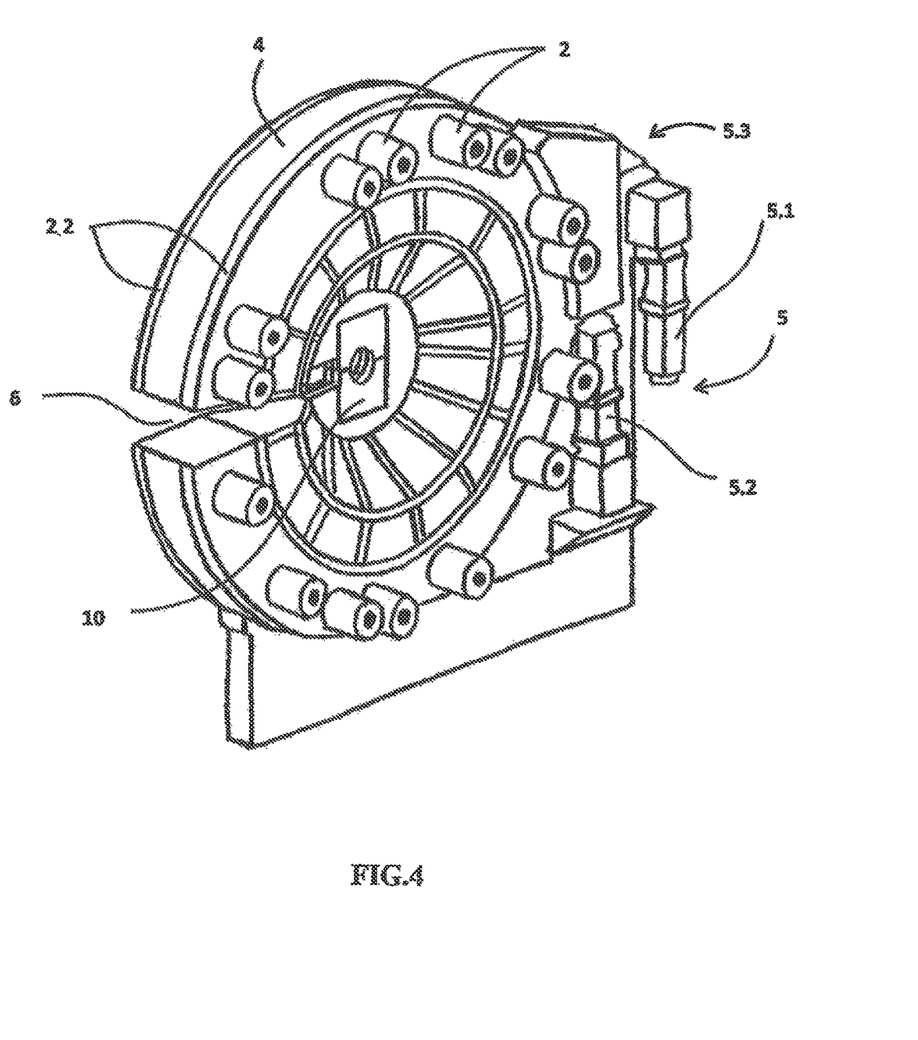

As can then be seen from FIG. 4, the first rotary disc ring 3.1 is equipped with the first independent drive 5.1 for the helical winding of the lower layer of the fibrous roving 21 onto the composite product 1 the second rotary disc ring 3.2 is equipped with the second independent drive 5.2 for circumferential winding of longitudinal layer of fibrous rovings 21 onto the composite product 1 and—not shown here—the third rotary disc ring 3.3 is equipped with the third independent drive 5.3 for helical winding of overlay fibrous rovings 21 onto the composite product 1 in the opposite direction to the winding of the lower layer.

The actual driving of the rotary disc rings 3 is assured via gear mechanism of independent drives 5 to the ring gears 22 which are installed onto the rotary disc rings 3.

Figure 5:
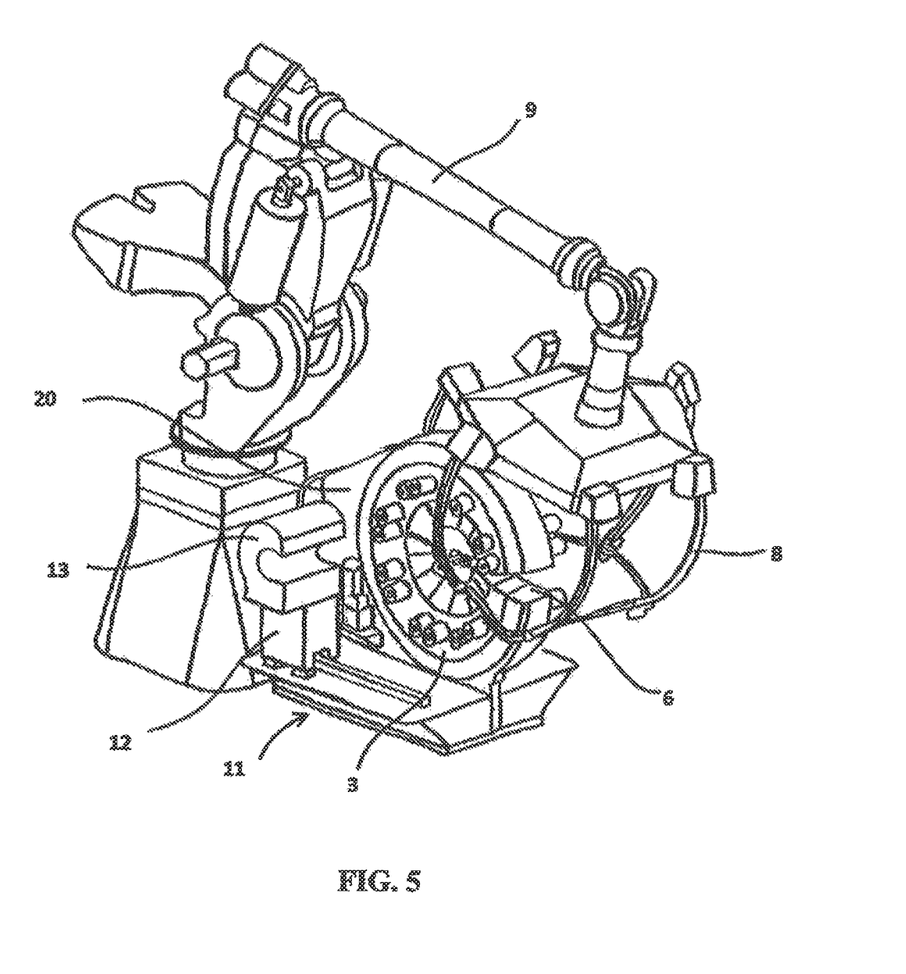

As seen from FIG. 5, on one side of the assembly of rotary disc rings 3 installed on the fixed ring frame 4 is arranged also the auxiliary device 11 for automatic initiation and termination of the lay up process. This auxiliary device 11 is formed by the auxiliary manipulator 12 in form of a running carriage with linear feed, equipped with a banding mechanism 13 for taping or strapping of the fibrous rovings 21 onto the composite product 1 before and after laying up procedure as well as with an split mechanism 14 for shearing the tapes or straps.

Figure 6:
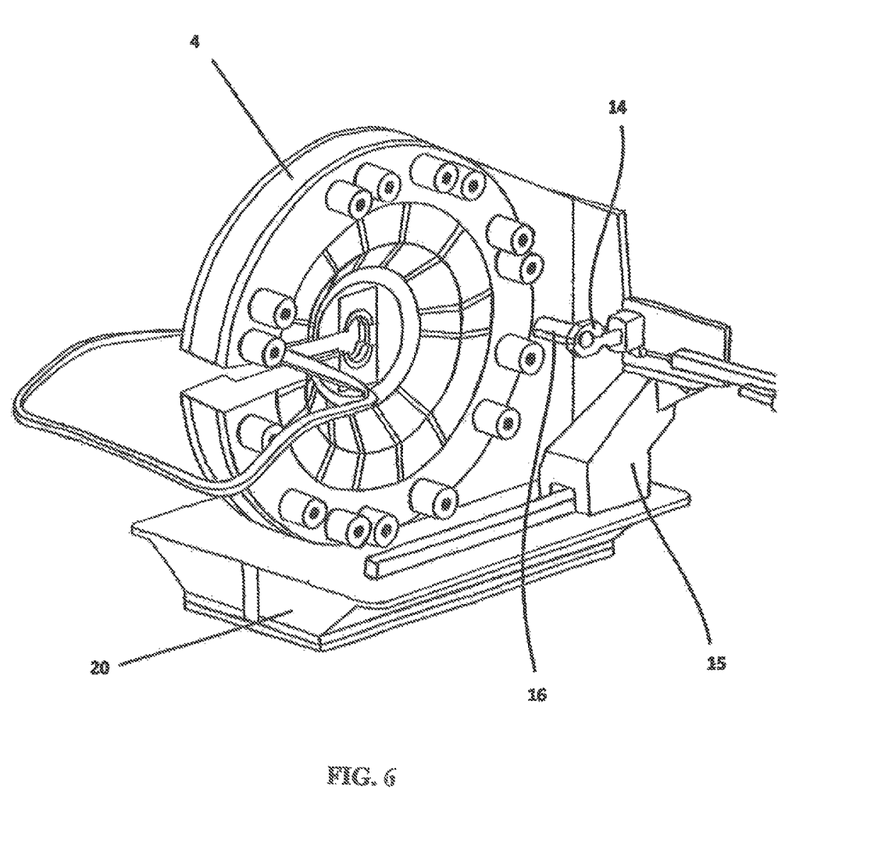

As shown in FIG. 6, along the other side of the set of rotary disc rings 3 mounted to the fixed ring frame 4, the loading manipulator 15 with the extrusion split mandrel 16 of the fibrous rovings 21 through the central openable rings 10 is arranged towards the auxiliary device 11. The movement of the extrusion split mandrel 16 through the axis of the central openable rings 10 towards the auxiliary device 11 and by simultaneously opening of the central openable rings 10, thus allowing on the one hand the above-mentioned loading of the composite product 1 and fibrous rovings 21 from the unwinding coils 2 in the axial inner space of 7 central openable rings 10 respectively rotary disc rings 3 and also the extrusion of fibrous rovings 21 to the banding mechanism 13 of the auxiliary device 11 prior to the commencement of the process of laying up.

FIELD OF THE APPLICATION

The device according to the invention can be widely used not only in the automotive industry for the production of structural components of vehicles, but also other structural elements in other fields of industry.

LIST OF REFERENCE SIGNS

1. Composite product
2. Unwinding coil
3. Rotary disc ring
   3.1 First rotary disc ring
   3.2 Second rotary disc ring
   3.3 Third rotary disc ring
4. Fixed ring frame
5. Self-contained drive
   5.1 First self-contained drive
   5.2 Second self-contained drive
   5.3 Third self-contained drive
6. Lateral passage
7. Inner space
8. Carrier grippers
9. Program-controlled manipulator
10. Central openable ring
11. Auxiliary device
12. Auxiliary manipulator
13. Banding mechanism
14. Split mechanism
15. Loading manipulator
16. Extrusion split mandrel
17. Guiding eyelets
18. Tool changer
19. Assembly grippers
20. Base frame
21. Fibrous rovings
22. Ring gears

The invention claimed is:

1. A device for laying up a composite product with fibrous rovings made from glass, carbon, aramid and other similar filaments, designed especially for production of composite reinforcements or supporting elements such as the reinforcement of tailgates of personal vehicles, consisting of individual unwinding spools (2) of fibrous rovings (21) rotatably arranged around the composite product (1), wherein the unwinding spools (2) are installed on the set of the rotary disc rings (3) which are mounted on a common fixed ring frame (4) and equipped with independent drives (5) with pre-programmed control of direction and speed of their rotation wherein the composite product (1) is during the laying up procedure alternately fixed to individual carrier grippers (8) of at least one program-controlled manipulator (9) and in each rotary disc ring (3) as well as in fixed ring frame (4) at least one lateral passage (6) is created for entry and exit of the composite product (1) between the unwinding spools (2).

2. The device for laying up a composite product with fibrous rovings according to claim 1, wherein the rotary disc rings (3) are installed on a common fixed ring frame (4) removable to allow their automatic exchange.

3. The device for laying up a composite product with fibrous rovings according to claim 1, wherein each rotary disc ring (3) is provided with a central openable ring (10) for introducing the composite product (1) and the fibrous rovings (21) from unwinding spools (2) into its inner space (7).

4. The device for laying up a composite product with fibrous rovings according to claim 1, wherein the set of rotary disc rings (3) comprises of three rotary disc rings (3.1, 3.2, 3.3) arranged laterally on the fixed ring frame (4) which the first rotary disc ring (3.1) is equipped with the first independent drive (5.1), the second rotary disc ring (3.2) with the second independent drive (5.2) and the third rotary disc ring (3.3) with the third independent drive (5.3) with the programmable control of speed and direction of rotation for laying up the fibrous rovings (21) onto the composite product (1) with a variable angle relatively to its central axis.

5. The device for laying up a composite product with fibrous rovings according to claim 1, wherein the one side of the system of rotary disc rings (3) mounted to the fixed disc frame (4) the auxiliary device (11) for the automatic start and end of winding and on the other side there is a loading manipulator (15) with an extrusion split mandrel (16) for introducing the fibrous rovings (21) via the central openable rings (10) toward the auxiliary device (11).

6. The device for laying up a composite product with fibrous rovings according to claim 5, wherein the auxiliary device (11) is formed by an auxiliary manipulator (12) with the banding mechanism (13) for taping or strapping the fibrous rovings (21) to the composite product (1) before and after winding as well as the split mechanism (14) for their cutting off.

7. The device for laying up a composite product with fibrous rovings according to claim 1, wherein the program-controlled manipulator (9) is provided with a tool changer (18) for the exchange of carrier grippers (8) of the composite product (1) for assembly grippers (19) for mounting of the rotary disc rings (3) to the ring frame (4).

* * * * *